(12) United States Patent
Sturk (10) Patent No.: US 9,108,771 B2
(45) Date of Patent: Aug. 18, 2015

(54) CLOSURES FOR PLASTIC CONTAINERS ADAPTED FOR AUTOMATED INSERT MOLDING

(76) Inventor: Ron Sturk, Brampton (CA)

( * ) Notice: Subject to any disclaimer, the term of this patent is extended or adjusted under 35 U.S.C. 154(b) by 39 days.

(21) Appl. No.: 12/919,670

(22) PCT Filed: Feb. 27, 2008

(86) PCT No.: PCT/CA2008/000373
§ 371 (c)(1),
(2), (4) Date: Nov. 22, 2010

(87) PCT Pub. No.: WO2009/105855
PCT Pub. Date: Sep. 3, 2009

(65) Prior Publication Data
US 2011/0049196 A1    Mar. 3, 2011

(51) Int. Cl.
| | |
|---|---|
| B67D 3/00 | (2006.01) |
| B67D 7/06 | (2010.01) |
| B65D 47/06 | (2006.01) |
| B29C 45/16 | (2006.01) |
| B65D 43/02 | (2006.01) |
| B65D 47/10 | (2006.01) |
| B29L 31/56 | (2006.01) |

(52) U.S. Cl.
CPC .......... *B65D 47/063* (2013.01); *B29C 45/1615* (2013.01); *B65D 43/0208* (2013.01); *B65D 47/103* (2013.01); *B29L 2031/565* (2013.01); *B65D 2543/0074* (2013.01); *B65D 2543/00092* (2013.01); *B65D 2543/00296* (2013.01); *B65D 2543/00518* (2013.01); *B65D 2543/00648* (2013.01); *B65D 2543/00685* (2013.01); *B65D 2543/00796* (2013.01)

(58) Field of Classification Search
CPC ............................ B67D 47/063; B67D 47/103
USPC .......................................... 222/526, 527, 530
See application file for complete search history.

(56) References Cited

U.S. PATENT DOCUMENTS

| | | | |
|---|---|---|---|
| 2,561,596 A * | 7/1951 | Rieke ............................. 222/527 |
| 3,604,740 A * | 9/1971 | Summers ................. 292/256.61 |
| 4,073,413 A * | 2/1978 | Tabler et al. ................... 222/529 |
| 4,403,709 A * | 9/1983 | Meins et al. ................... 220/703 |
| 4,442,949 A * | 4/1984 | Dwinell et al. ............ 220/257.2 |

(Continued)

*Primary Examiner* — Kevin P Shaver
*Assistant Examiner* — Jeremy W Carroll
(74) *Attorney, Agent, or Firm* — Eugene Gierczak (57) ABSTRACT

A closure assembly for the dispensing of fluids from plastic containers such as pails. The closure assembly is adapted for automated insert molding attachment to container lids. The closure assembly is pre-assembled from a threaded plastic closure cap and closure body prior to insert molding. The plastic closure body has a nestable and extendable conical body web leading inward to a body neck closed by a tamper evident diaphragm seal. The conical body web leads outward to an improved radial body clamp flange and novel cylindrical body skirt. Cap bails lie radially inside and brace the body clamp flange from distortion. Once inserted and clamped into the container lid mold, only the body skirt is exposed for attachment to the container lid. Molten plastic is introduced into the mold void to form the container lid. This patent discloses optional body skirt recesses. During molding the introduced polymer envelopes the body skirt and enters the skirt top recess and skirt bottom recess mechanically locking the skirt to the lid. The plastic bond and/or mechanical lock between the body skirt and the plastic container lid combined with the diaphragm seal in the body neck resist leaks and provide tamper evident means.

16 Claims, 9 Drawing Sheets

(56) References Cited

U.S. PATENT DOCUMENTS

| | | | |
|---|---|---|---|
| 4,632,282 A * | 12/1986 | Nagashima | 222/529 |
| 5,678,735 A * | 10/1997 | Guglielmini | 222/153.06 |
| 6,435,384 B1 * | 8/2002 | Davis et al. | 222/529 |
| 6,641,007 B2 * | 11/2003 | Chung et al. | 222/529 |
| 2004/0118880 A1 * | 6/2004 | Arciniegas et al. | 222/530 |
| 2007/0056996 A1 * | 3/2007 | Zijing et al. | 222/530 |

* cited by examiner

CLOSURES FOR PLASTIC CONTAINERS ADAPTED FOR AUTOMATED INSERT MOLDING

BACKGROUND OF THE INVENTION

This invention relates to fluid dispensing closures fabricated of plastic materials. The closures are designed for insert molding into plastic containers such as pails. The benefits offered by insert molding include tamper evident attachment, superior leak resistance and lower manufacturing costs.

Tamper evident closures can help prevent theft, dilution, exchange or contamination of valuable container contents. Closures attached with a permanent insert molded bond between closure and container lid are tamper evident as the bond once broken cannot easily be repaired. Closures commonly attached by the use of metal crimp rings or by plastic snap fit are not considered tamper evident. These closures may be removed and replaced with new closures without evidence of tampering. Closures attached by ultrasonic welding meet the tamper evident criteria, but ultrasonic welding is a slow and more technically difficult process.

For container leak resistance and mechanical drop strength, the insert molded closure must be securely attached to the lid polymer. Where the container lid polymer is not fully compatible with the closure polymer (such as polypropylene with polyethylene) this invention discloses the use of top and bottom circumferential recesses on the body skirt. During molding the lid polymer enters the skirt recesses and mechanically locks the closure to the lid.

Another objective of this new design is to lower container manufacturing costs. A cap bail smaller in diameter than the body clamp flange permits the lower cost pre-assembly of the closure cap to the closure body. The outer annular closure body skirt helps separate parts for orientation, feeding and insertion by automated parts handling equipment. While these closures may be placed in the mold manually, the improved closure design facilitates automated insert molding.

DESCRIPTION OF THE PRIOR ART

| U.S. Pat. No. 4,555,048 | Vented nestable pouring spout | M. Hamman 16 May 1984 |
|---|---|---|
| U.S. Pat. No. 4,865,793 | Method of insert injection molding | Suzuki et al. 12 Sep. 1989 |
| U.S. Pat. No. 5,788,100 | Closure with two position lock ring | Sturk 26 Jun. 1998 |
| U.S. Pat. No. 5,899,364 | Insert molded tamper evident pouring spout | Mclelland 4 May 1999 |
| U.S. Pat. No. 5,913,460 | Plastic lid with fused pour spout and a method and apparatus for making same | Arciniegas 22 Jun. 1999 |
| U.S. Pat. No. 5,967,376 | Insert molded tamper evident pouring spout | Mclelland 19 Oct. 1999 |
| U.S. Pat. No. 5,823,377 | Screw cap having a tamper resistant connection to a plastic container | Krautkramer October 1998 |
| U.S. Pat. No. 6,108,888 | Method for making a spout and mold structure | Kimura 29 Aug. 2000 |
| U.S. Pat. No. 6,488,177 | Plastic lid with fused pour spout and a method and apparatus for making same | Arciniegas 3 Dec. 2002 |

The prior art teaches the design of fluid dispensing closures for plastic containers. Closures are typically assembled from a rigid plastic closure cap and a flexible and extendable plastic closure body. Attachment to container lids may be by metal crimp ring or plastic lock rings. Ultrasonic welding and insert molding are also disclosed as closure installation methods. Prior art discloses the use of manual and automatic parts feeding for insert molding.

While the practice of insert molding closures into plastic container lids is known from prior art, significant production and quality problems have limited its commercial success to date. The mechanical feeding and accurate insertion of closures into the mold every mold cycle must be repeatable and reliable, or the automatic machine cycle will stop. Plastic closures can be damaged by too much heat and pressure from the clamping tooling. The high lid plastic injection pressure can force the closure out of its clamped position. An objective of this invention is to provide an improved closure design adapted for automated insert molding.

U.S. Pat. No. 4,555,048 (1984) Hamman, describes a vented nestable pouring spout closure which can be assembled to both metal pails and plastic pails. The closure is attached by the common method of crimping of a metal attachment band over a beaded rim lid opening.

U.S. Pat. No. 4,865,793 (1989) Suzuki, discloses a method of insert injection molding. The invention teaches the use of robots to place inserts in the mold tooling. The inserts can be held by mechanical interference fit or by vacuum. Once the mold is closed, the molten plastic is injected and bonds to the insert. The laminate foil products described in this patent are unlike the closures described in this present invention.

U.S. Pat. No. 5,788,100 (1998) Sturk, disclose a pail lid closure with two position lock ring made entirely of plastic to facilitate plastic pail recycling and eliminate corrosion of the metal attachment band. Closures are held by interference press fit over a beaded rim lid opening and are not tamper evident.

U.S. Pat. No. 5,823,377 (1998) Krautkramer, teaches a two part bellows closure which is preassembled and subsequently engaged through a hole fabricated in a previously molded container lid component. The two-part bellows closure has two flanges contacting the lid, and the cap flange is ultrasonically welded to the lid component. Tamper evidence is provided by a frangible tear strip integrally molded to the threaded closure cap. This ultrasonic welding method provides a tamper evident plastic to plastic bond. However in practice, the complex equipment required and the several process variables (temperature, frequency, pressure) make ultrasonic welding process difficult and expensive. The present invention discloses an improved closure for the technically simpler insert molding process.

U.S. Pat. No. 5,899,364 (1999) and U.S. Pat. No. 5,967,376 (1999) McLelland, disclose a flexible pouring spout for insert molding in containers. The closure incorporates a tamper evident cap ring. Both the spout body flange and the tamper evident cap ring are clamped between the upper mold and lower mold tooling with the intent that molten plastic not be permitted to migrate between the two insert components. During insert molding both the closure cap ring and the spout body flange are bonded to the plastic container lid.

U.S. Pat. No. 5,899,364 also discloses the distortion effects associated with the pressures and temperatures of the injected molten plastic. This prior art has the advantage of a clearly tamper evident cap ring. But this closure design introduces the difficulty of securely clamping two layers (cap ring and body flange). This design also makes sequential parts feeding difficult, as the narrow peripheral flange edges can easily overlap.

U.S. Pat. No. 5,913,460 (1999) and U.S. Pat. No. 6,488,177 (2002) Arciniegas, disclose a plastic lid with fused pour spout and a method and apparatus for making same. To avoid interference with the cap bails, the cap is not pre-assembled to the closure body. Only the closure body is inserted and clamped in the mold. After the closure body is insert molded, the caps need to be threaded onto the spouts. This extra production step adds to manufacturing costs. The mold insert tooling as disclosed applies clamping force to the thin conical body web. Heat in the tooling and clamping pressure can introduce stress in the conical body web and may lead to premature plastic cracking. Arciniegas indicates there are cooling circuits within the clamping components to mitigate the effects of heat.

U.S. Pat. No. 6,108,888 (2000) Kimura, discloses a method for making a lid with a spout and mold structure. The patent discloses an existing closure (sold internationally with the trade name Tri-Sure Ultra Bond) with a conventional method of affixing the spout to the lid by ultrasonic welding. Kimura has developed tooling to insert mold this existing closure. As the closure was not purposely designed for insert molding there are several design compromises. The cap bails overlay the insert molding area, and must be installed after insert molding. The perpendicular body flanges (25a) are narrow and will overlap and jam in parts feeding equipment. To clamp the closure it is necessary to place core insertion member (41) in direct contact with thin spout (25c). As discussed above in the Arciniegas design, the heat and clamping stress may damage the thin conical body web.

The closure as detailed in the present invention embodies key improvements for insert molding. The improvements are detailed in the following Summary of the Invention. Prototype molding tests have confirmed these design improvement.

SUMMARY OF THE INVENTION

Prior art designs for insert molded dispensing closures for plastic containers have commercial limitations. The present invention introduces several necessary improvements for automated insert molding.

The present invention introduces a smaller diameter cap whose cap bail(s) lie inside of the radial body clamp flange. As the cap bails thus do not interfere with insert molding, the caps are preferably pre-assembled to closure bodies. The position of the cap bails serves another important function. During packing and shipment of the closure assemblies the shipping weight will tend to crush the closures. The more rigid plastic cap and bails brace the soft plastic clamp flange and body skirt helping to prevent distortion. Ensuring that the closure assembly is not distorted will be critical during the insertion stage into the injection mold.

The present invention introduces a relatively thick body clamp flange which lies radially outside of the relatively thin conical body web. The mold core and cavity inserts clamp against this larger diameter and thicker clamp flange. The resulting air gap protects the thin body conical web from heat and stress. Water cooling channels in the mold insert tooling (not shown) control heat build-up. As the body clamp flange is the only layer clamped in the mold, this eliminates possible slip between cap and body flanges as discussed in prior art.

The body clamp flange leads radially outward to an axially dependent body skirt. When the closure is clamped in the mold, the body skirt is the only part exposed for attachment to the container lid. During injection molding of the container lid, the body skirt come into direct contact with the introduced plastic. The compressive force of the molten plastic pressure pushing against the body skirt is resisted by the underlying position of the core insert clamp shoulder. The body skirt may be partially re-melted from the introduced resin heat and will fuse with similar plastic resins to create a permanent leak resistant bond. In its preferred embodiment the attachment skirt also has an annular top recess and annular bottom recess. Molten resin flows into the recesses creating in cross section a nominally "C clamp" shape which locks the closure to the lid.

The invention also introduces an improved way to place and secure closures in the lid mold inserts. The axially dependent shape of the closure body skirt performs another important function. The cylindrical body skirt is adapted to facilitate parts orientation and promote sequential feeding by automated material handling equipment. Parts will not tangle. Closure handling equipment may include the use of robots or similar mechanical devices for picking and inserting the closure assemblies into the lid injection mold.

A mechanical arm and parts gripper can accurately pick up the closure assembly off a sequential parts feeder (conveyor) by temporary attachment to the body neck portion. The mechanical parts gripper is reoriented and repositioned to place the closure against the mold cavity. A vacuum or other mechanical means temporarily holds the closure assembly in position. The annular body clamp flange in contact with the cavity insert clamp shoulder acts as an uninterrupted vacuum seal. Alternately the closure assembly can be placed into the cavity insert. Manual insertion of closures is another option. Once the closure is inserted, the mold closes, and the lid is injection molded. After the plastic lid is cooled sufficiently, the lid and closure are removed and the cycle is repeated.

LIST OF DRAWING NUMBERS

| Number | Description |
| --- | --- |
| 1 | container |
| 2 | container lid |
| 3 | lid flange |
| 4 | closure assembly |
| 5 | closure cap |
| 6 | cap bail |
| 6A | cap bail lower wall |
| 7 | cap bail hinge |
| 7A | bail hinge shoulder |
| 7B | bail hinge ramp |
| 8 | cap threaded wall |
| 9 | closure body |
| 10 | body neck |
| 11 | diaphragm seal |
| 12 | diaphragm pull ring |
| 13 | conical body web |
| 14 | body clamp flange |
| 15 | body skirt |
| 15A | skirt projection |
| 16 | skirt top recess |
| 17 | skirt bottom recess |
| 18 | flow restrictor tab |
| 19 | microporous vent |
| 20 | mechanical arm |
| 21 | parts gripper |
| 21A | gripper vacuum line |
| 22 | mold cavity insert |
| 23 | cavity insert clamp shoulder |
| 24 | cavity insert vacuum line |
| 25 | mold core insert |
| 26 | core insert clamp shoulder |
| 27 | core insert vacuum line |
| 28 | lid injection mold |

DETAILED DESCRIPTION OF A PREFERRED EMBODIMENT OF THE PRESENT INVENTION

Figure 1:
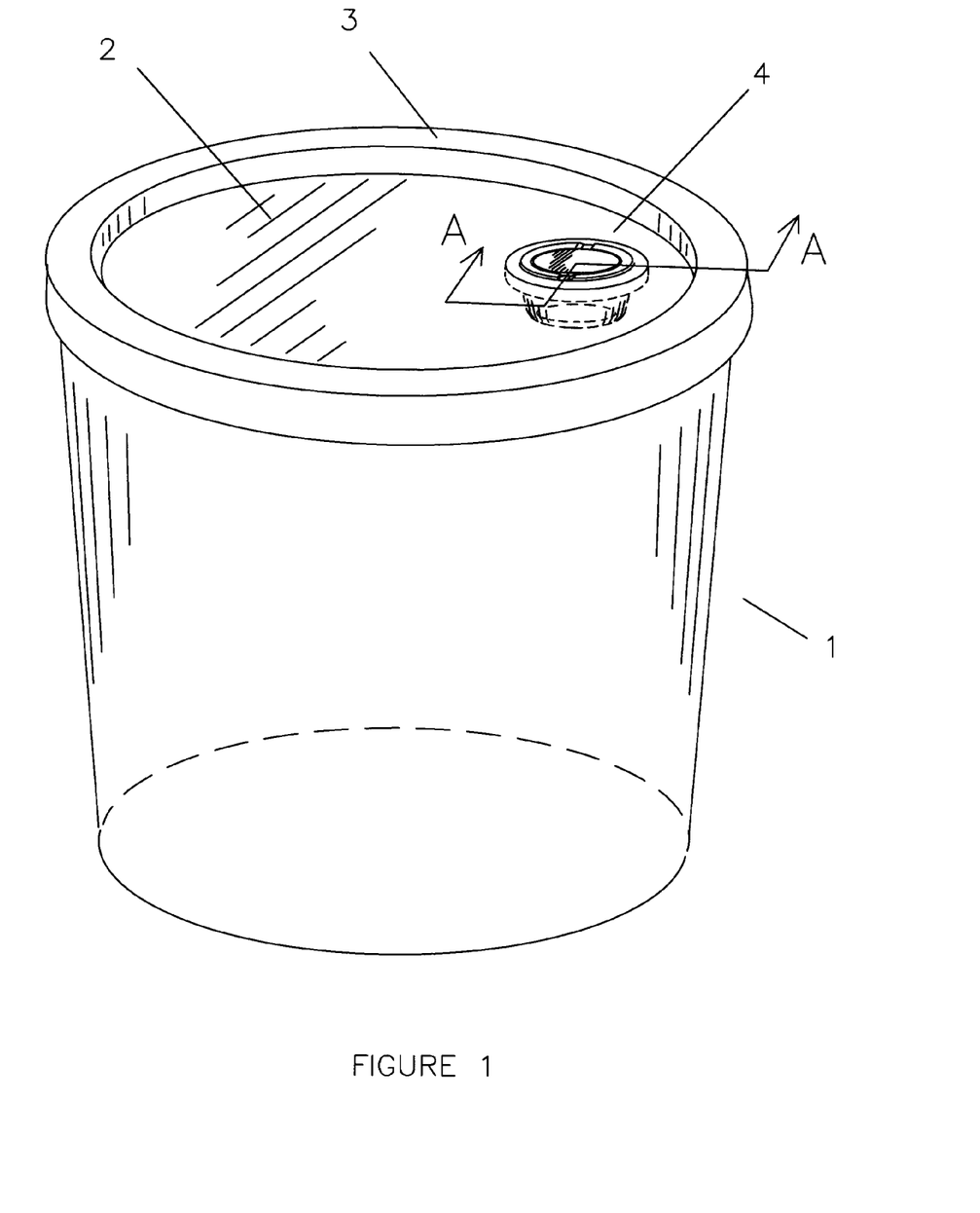
FIG. 1 is a perspective view of a container and lid with insert molded closure assembly

Referring first to FIG. 1, there is shown a container 1 having a container lid 2 leading to lid flange 3. The lid flange 3 incorporates latching means and a gasket to close the container 1 in a well known manner. The container lid 2 is attached to a closure assembly 4 by insert molding means. The closure assembly 4 is used for both sealing of the container and for fluid dispensing. The present invention will describe novel features of closure assembly 4 that improves mold insertion and tamper evident attachment to the closure lid 2 by the insert molding method.

Figure 2:
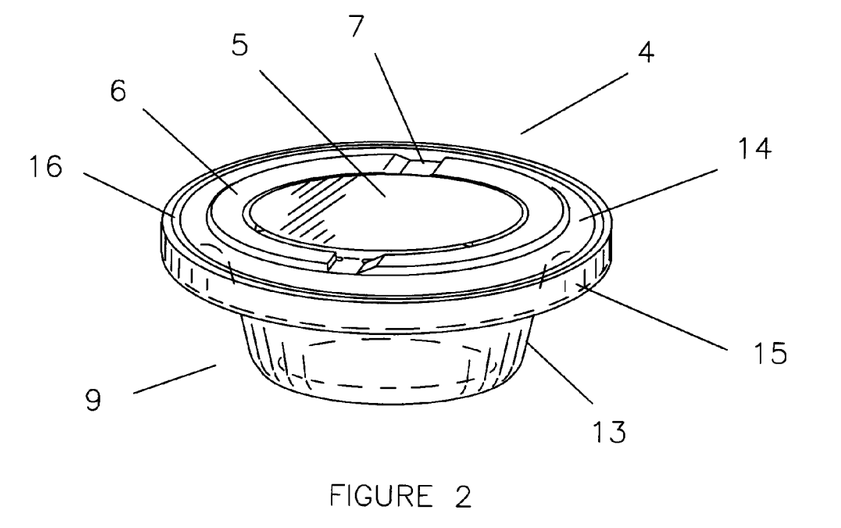
FIG. 2 is a perspective view of the closure assembly

Referring now to FIG. 2, the closure assembly 4 is show in a perspective view prior to insert molding. Closure assembly 4 is shown in the compact nested position as a two part assembly of a closure cap 5 and closure body 9. The closure cap 5 is molded from a relatively stiff plastic. The closure body 9 is molded from relatively flexible plastic. Closure cap 5 has a top flat panel leading outward to two cap bail hinges 7 and one or more cap bails 6. The cap bails 6 lie radially inside of the body clamp flange 14 and body skirt 15. One major advantage of this invention is that the small diameter cap 4 and cap bails 6 can be assembled to the closure body 9 prior to insert molding. The cap bails 6 can radially brace against body clamp flange 14.

Figure 3:
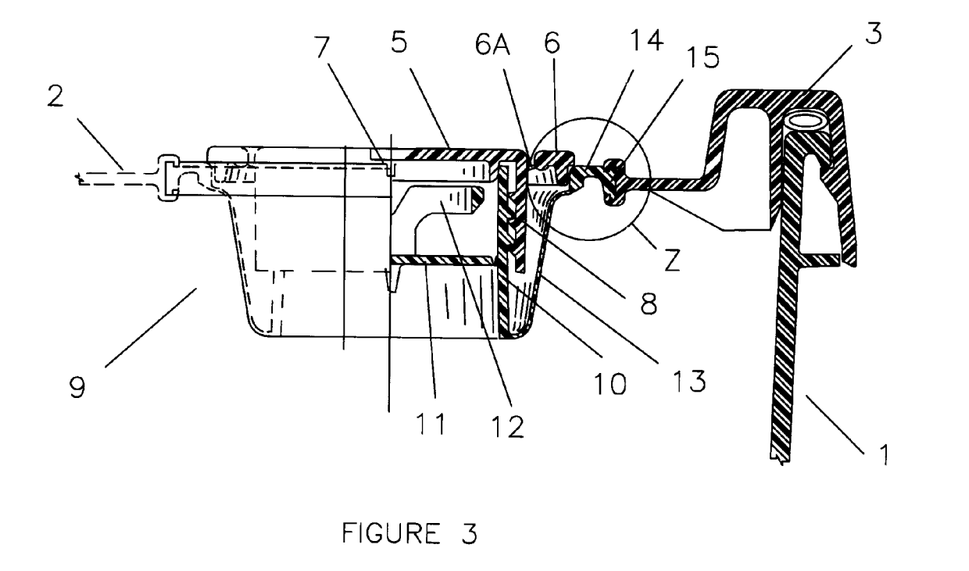
FIG. 3 is cross-sectional view A-A in FIG. 1 of the insert molded closure assembly and part of the container and lid

FIG. 3 is partial cross-sectional view A-A of FIG. 1 of the closure assembly 4 attached by insert molding means to container lid 2. Part of container 1 and lid flange 3 are shown in cross section. The flexible closure body 9 is shown in the nested position. Closure cap 5 is in threaded engagement by cap threaded wall 8 to body neck 10. Inside the body neck 10 is diaphragm seal 11. In a well know manner, the diaphragm seal 11 may be removed by diaphragm pull ring 12. The body neck 10 leads to the relatively thin and flexible conical body web 13. The nominally conical body web 13 leads outward to body clamp flange 14 and body skirt 15.

Figure 4A:
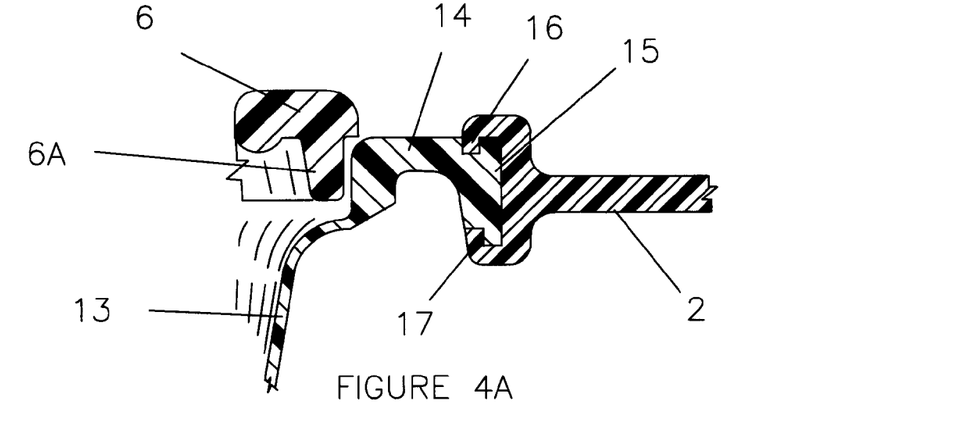
FIG. 4A is a detailed view corresponding to the content of the circle Z in FIG. 3
Figure 4B:
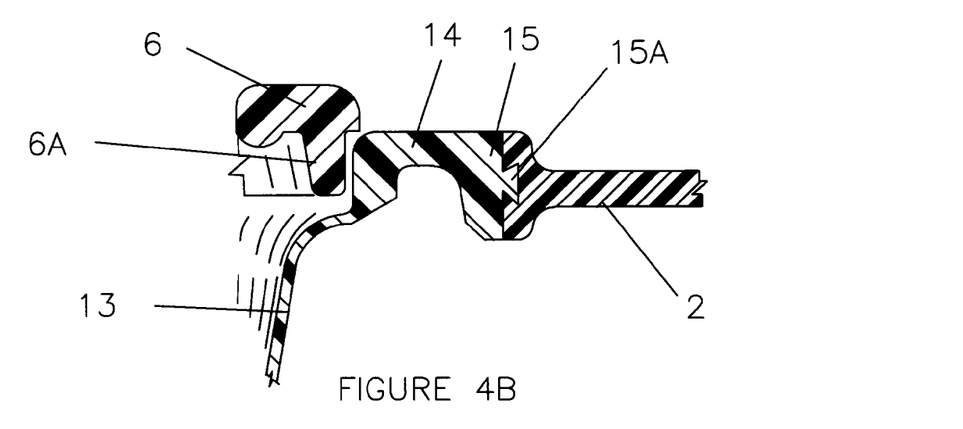
FIG. 4B is a detailed view corresponding to the content of the circle Z in FIG. 3 with first alternate container lid attachment
Figure 4C:
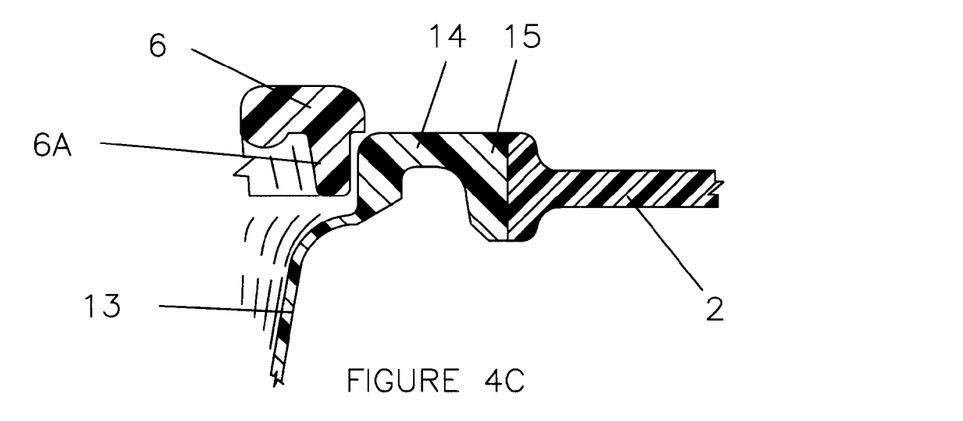
FIG. 4C is a detailed view corresponding to the content of the circle Z in FIG. 3 with second alternate container lid attachment

FIGS. 4A, 4B and 4C provide a detailed view Z of three possible arrangements of the body skirt 15 bonded to the container lid 2. The conical body web 13 leads outward to the radial clamp flange 14, and further outward to the axially dependent body skirt 15. The cap bail 6 cross section clearly shows the cap bail lower wall 6A which lies radially inward (and braces) body radial clamp flange 14. FIG. 4A detail discloses that the body skirt 15 in its preferred embodiment also has a skirt top recess 16 and skirt bottom recess 17 or the like.

Depending upon customer tooling, polymers used and packaging requirements, the container lid 2 can be modified to attach to the body skirt 15 in a variety of configurations. The body skirt 15 may include one or more recesses or skirt projections 15A as shown in FIG. 4B to aid mechanical attachment. Alternately FIG. 4C shows container lid 2 joining body skirt 15 without mechanical locking means. In this configuration the attachment relies solely on the polymer to polymer bond.

Figure 5:
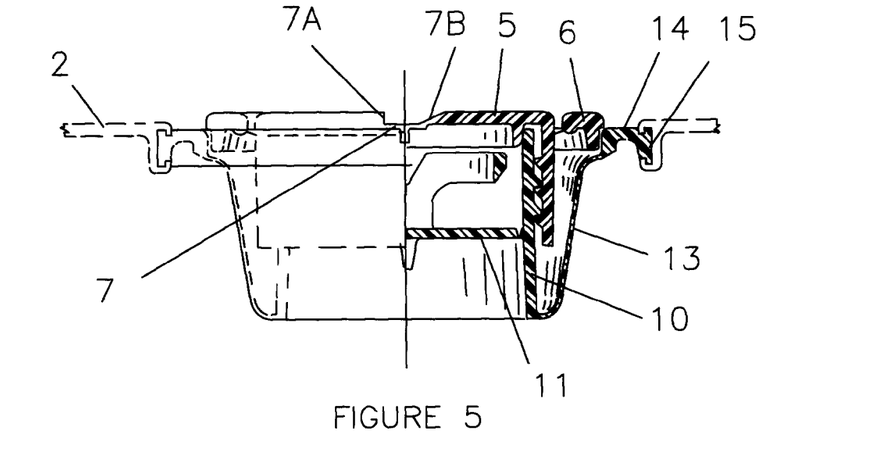
FIG. 5 is a partial cross-sectional view of the insert molded closure assembly in the nested position

FIG. 5 is a partial cross-sectional view of the insert molded closure assembly 4 in the nested position. This drawing shows structural details of the cap bail 6 and cap bail hinge 7. The closure cap 5 leads outward to one or more bail hinges 7. A bail hinge shoulder 7A facilitates the threading of the closure cap 5 to the body neck segment 10. An automatic threading machine (not shown) may have rotating projections designed to mate with the diameter of the cap bail hinge 7. During assembly the projections will slide into the recess created by the bail hinge shoulder 7A and bail hinge ramp 7B. The rotating projections will push against the bail hinge shoulders 7A until the closure cap 5 is assembled to the closure body 9. The bail hinge ramp 7A discourages manual removal of the closure cap 5 and container tampering. See FIG. 7 for a top view of these bail elements.

Figure 6:
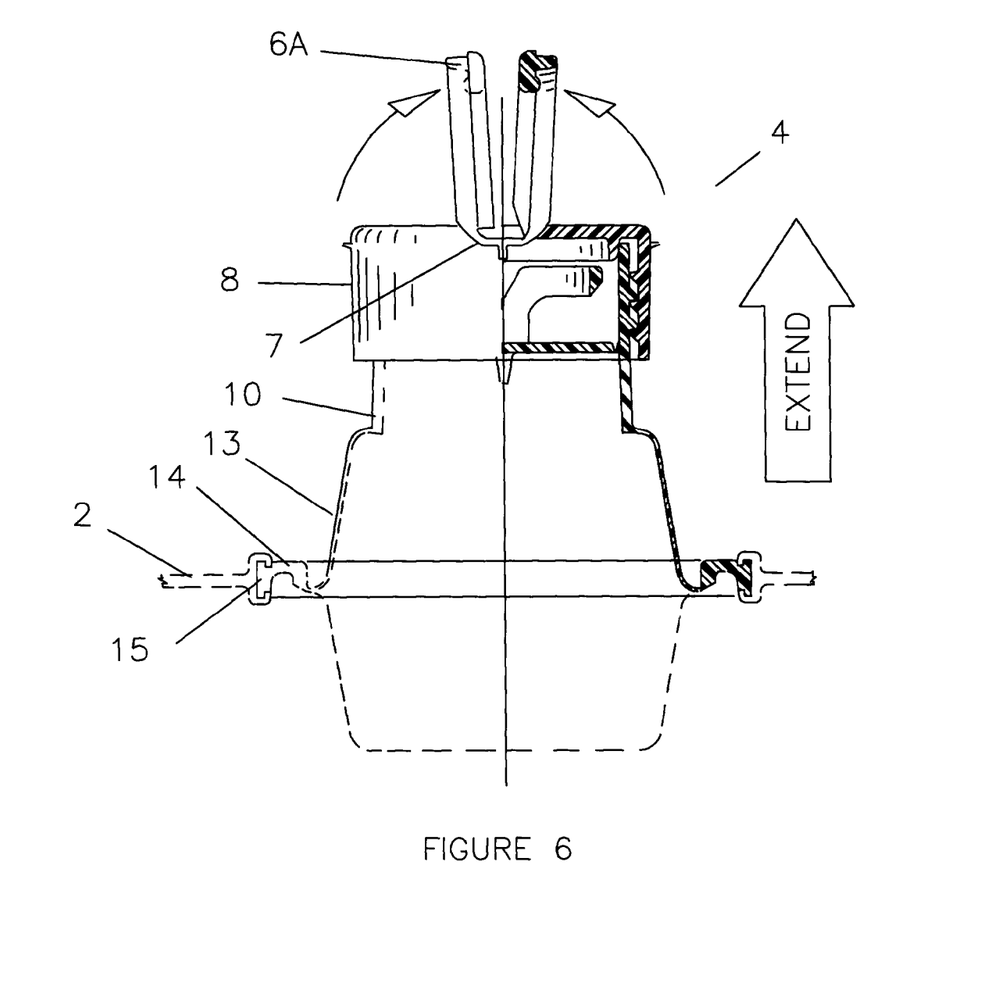
FIG. 6 is a partial cross-sectional view of the insert molded closure assembly in FIG. 5 the extended position

FIG. 6 is a partial cross-sectional view of the insert molded closure assembly 4 in the extended position. To extend the closure 4 the cap bails 6 are lifted by hand, a finger is inserted under the bails and the closure is extended in the well known manner.

Figure 7:
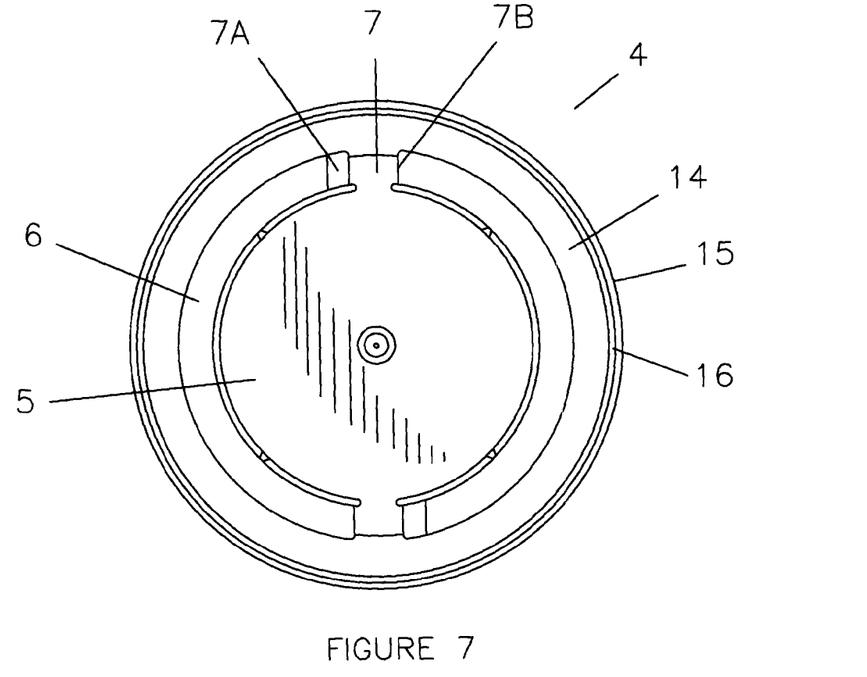
FIG. 7 is a top view of closure assembly in FIG. 2

FIG. 7 is a top view of closure assembly 4 in FIG. 2.

Figure 8:
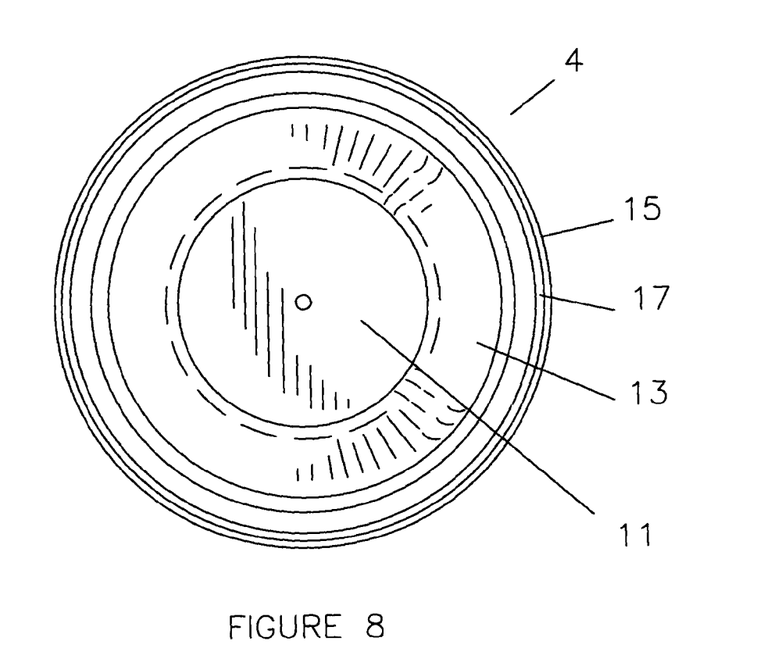
FIG. 8 is a bottom view of closure assembly in FIG. 2

FIG. 8 is a bottom view of closure assembly 4 in FIG. 2.

Figure 9:
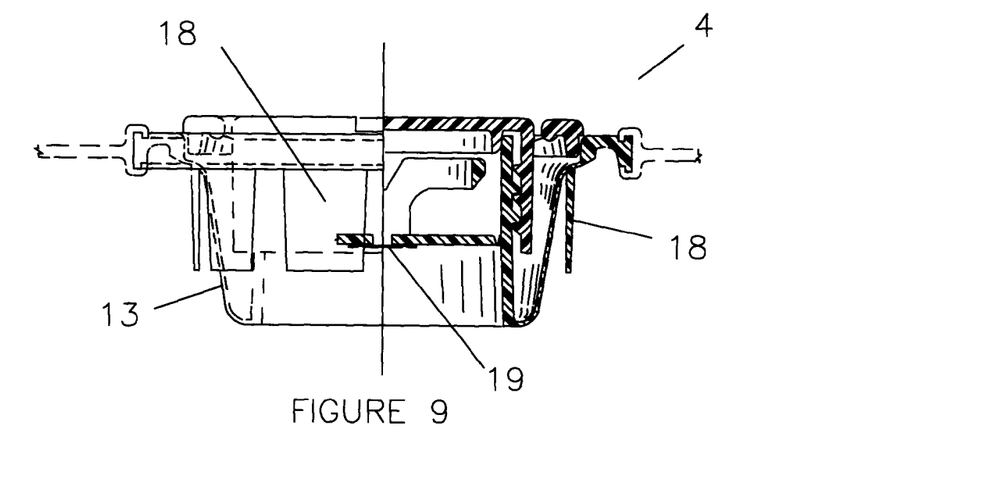
FIG. 9 is a partial cross-sectional view of the insert molded closure assembly in the nested position with optional flow restrictor tabs and optional microporous vent

FIG. 9 show an insert molded closure assembly 4 with the optional addition of one or more flow restrictor tabs 18. Flow restrictor tabs 18 are commonly used for the benefit of reducing the pulsation of the fluids during pouring. The flow restrictor tabs 18 are shown as part of this invention because this insert molding tooling design (shown in FIG. 13) clearly accommodates this feature. Some prior art insert molded closures have different part insertion and clamping arrangements which prevent the use of beneficial flow restrictor tabs 18. FIG. 9 also shows an optional microporous vent 19 attached by thermal bonding to the body diaphragm seal 11.

Figure 10:
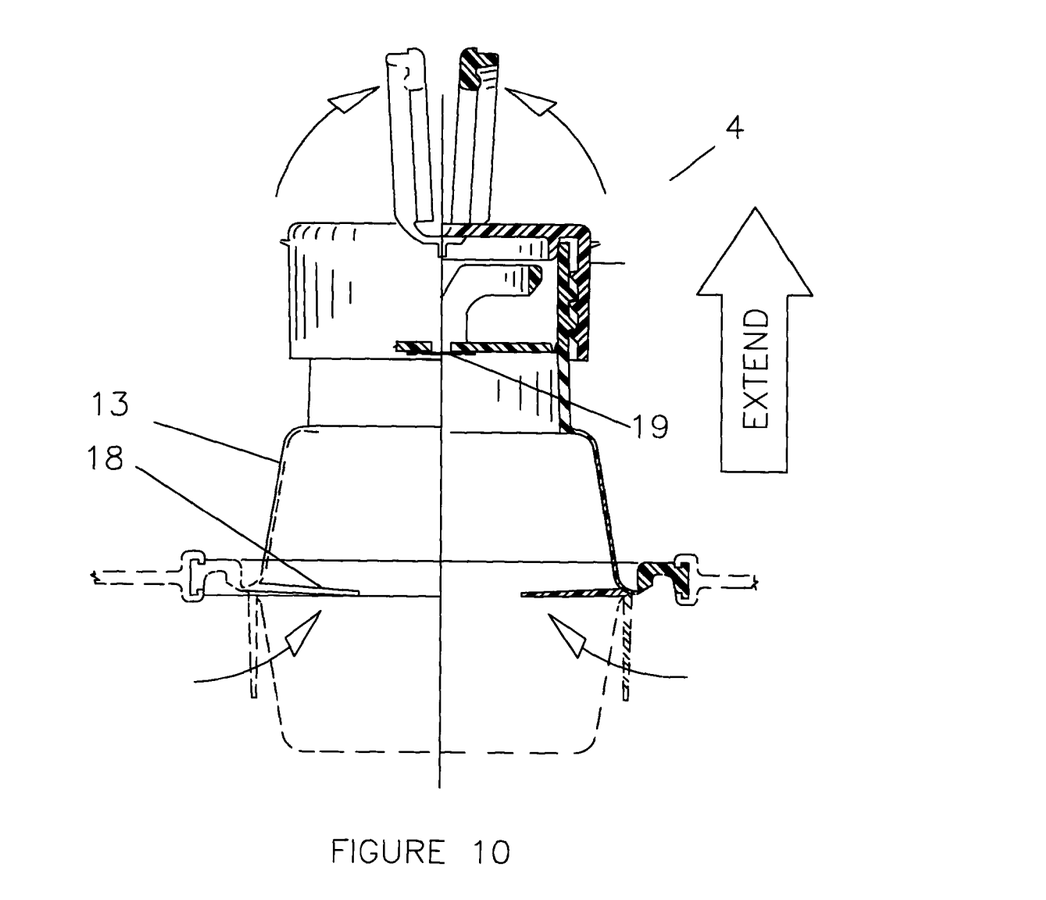
FIG. 10 is a partial cross-sectional view of the insert molded closure assembly in FIG. 9 in the extended position

FIG. 10 is a partial cross-sectional view of the insert molded closure 4 in FIG. 9 shown in the extended position. As the conical body web 13 is pulled from a nested to extended position, the flow restrictor tabs 18 rotate inward about 90 degrees in the manner taught in prior art.

Figure 11:
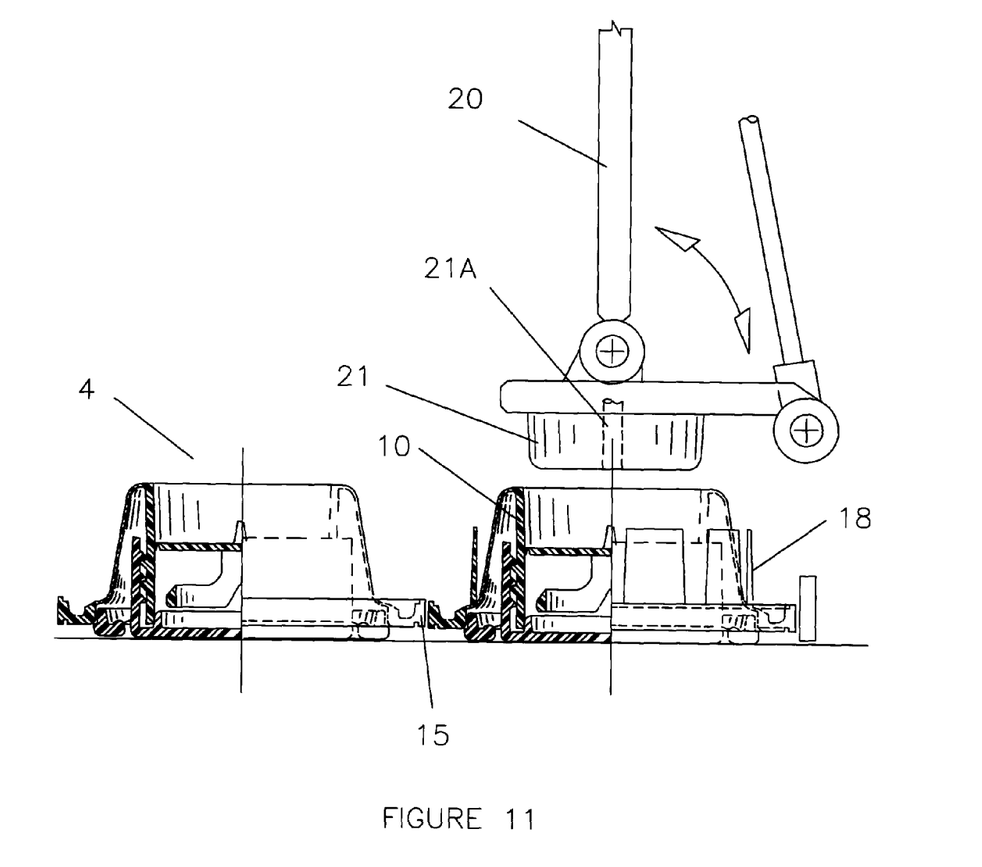
FIG. 11 is a partial cross sectional view of two closures assemblies ready for pick up by mechanical arm and parts gripper.

FIG. 11 shows two closures assemblies 4 ready for pick up by a mechanical arm 20 and parts gripper 21. The parts gripper 21 has a diameter and taper to mate with the inside diameter of the body neck 10. A vacuum applied through gripper vacuum line 21A will ensure positive pick up of the closure assembly 4. The body attachment skirt 15 is shown in contact with a second body skirt 15. The preferred arrangement of this invention shows a relatively tall cylindrical body skirt 15 acting to keep parts from tangling for optimum sequential parts feeding.

Figure 12:
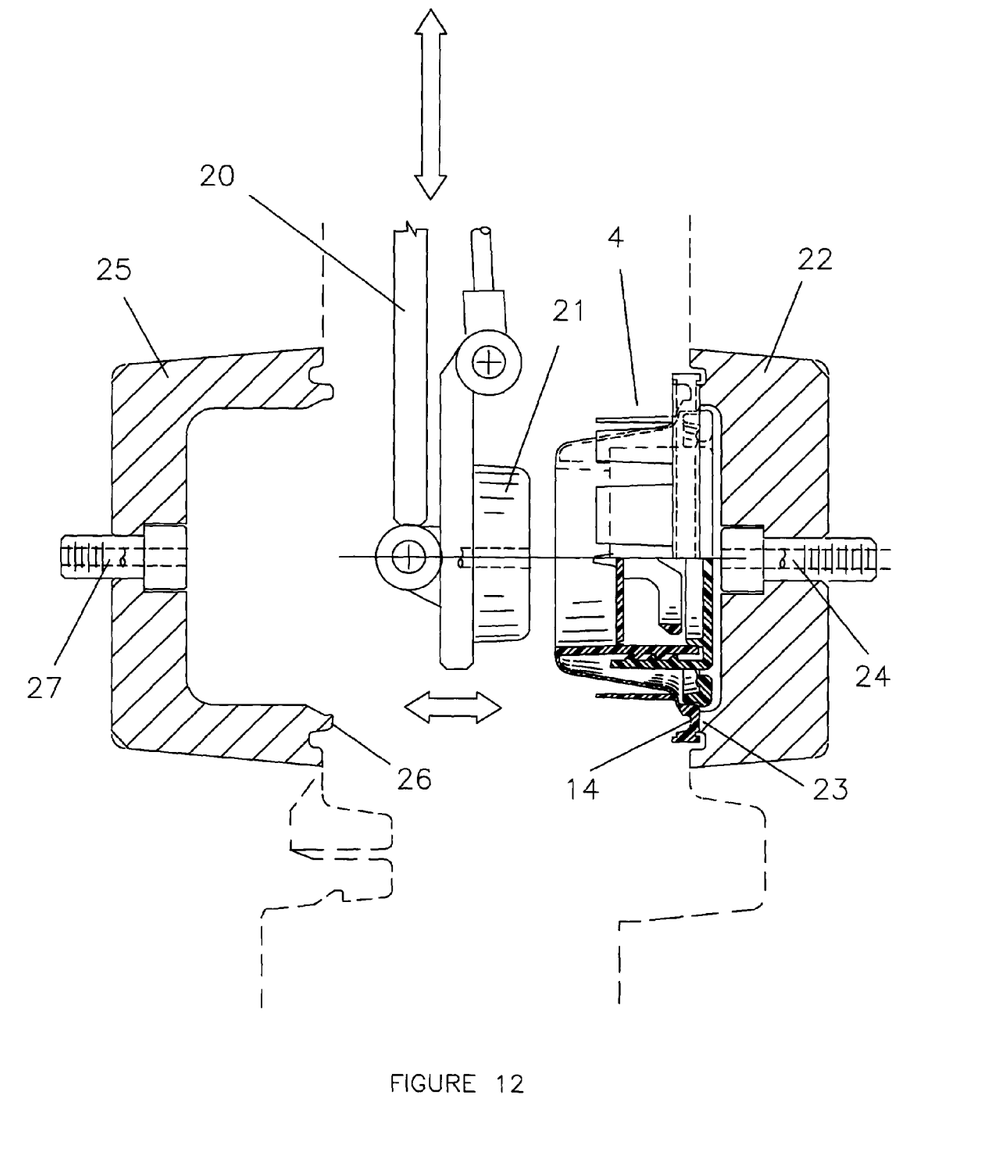
FIG. 12 is a partial cross sectional view of a closure assembly inserted into the container lid injection mold by mechanical arm and parts gripper

FIG. 12 shows closure assembly 4 delivered by mechanical arm 20 into vacuum attachment to mold cavity insert 22. A cavity insert vacuum line 24 could be located at any position in the cavity insert 22. A vacuum seal is established between the flat annular body clamp flange 14 and cavity insert clamp shoulder 23. Using the same method, multiple closures assemblies 4 may be delivered to a multi-cavity cover injection mold 28.

An alternate installation method in keeping with the spirit of this invention is to pick up the closures by the closure cap 5 or body clamp flange 14. The parts could be placed by robot into the mold core insert 25. The parts may be held by mechanical friction fit in the mold core insert 25, or by the assistance of a vacuum through core insert vacuum line 27. A further alternate method of loading the closure assemblies 4 is to place the closures manually into the mold insert. Manual parts loading may be preferable where single or double cavity molds are used or where labor costs are low.

Figure 13:
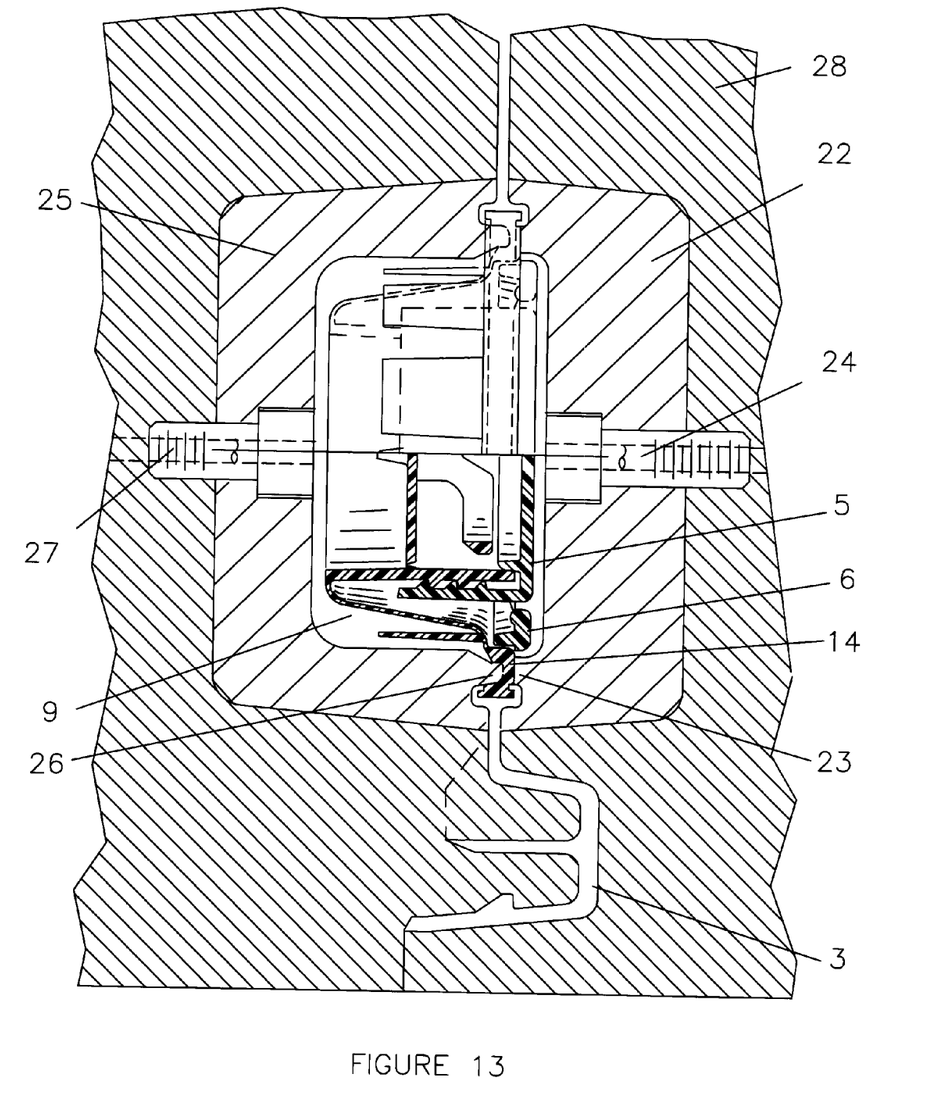
FIG. 13 is a partial cross sectional view of a closure assembly clamped in a container lid injection mold ready for insert molding

FIG. 13 is a partial cross sectional view of a closure assembly 4 clamped in a lid injection mold 28 ready for insert molding. Cavity insert clamp shoulder 23 and core insert clamp shoulder 26 apply opposing clamp forces to body clamp flange 14. This clamp force secures the closure assembly 4 from movement during the injection molding process. The radially inward pressure of the introduced molten plastic against body attachment skirt 15 is opposed by the position of the core insert clamp shoulder 26 inside the body skirt 15 as shown in the tooling layout.

According to the present invention, the steps of affixing the closure assembly to the container lid and forming the container lid itself are carried out at the same time. While one mold cavity is shown, multiple cavities can be molded simultaneously.

It will be understood that the claims are intended to cover all changes and modifications of the preferred embodiments of the invention herein chosen for the purpose of illustration which do not constitute a departure from the spirit and scope of the invention.

What is claimed is:

1. A two part closure assembly for dispensing fluids from a container, the assembly characterized by:
    (a) a plastic closure body having a flexible nominally conical body web axially extendible between a nested position and an extended position, said conical body we extending inward to a cylindrical body neck and extending radially outward to a radial body clamp flange, said body clamp flange extending further radially outward to an annular body skirt presenting an axially disposed skirt inner surface radially displaced from an axially disposed skirt outer surface, said annular body skirt further having an annular skirt top recess and annular skirt bottom recess; said skirt top recess, said skirt outer surface and said skirt bottom recess engaging a plastic container lid;
    (b) an internal tamper evident diaphragm seal disposed in said body neck; and
    (c) a plastic closure cap threadably engageable to said body neck, said closure cap having one or more integrally molded cap bails for extending said closure body, said cap balls having an upper radially disposed portion and a lower portion disposed axially downward from said upper portion and radially inward of said body clamp flange for bracing said body clamp flange from radial distortion in the nested position.

2. The assembly of claim 1, characterized in that said one or more integrally molded cap bails include:
    (a) a shoulder at one end thereof to enable axial rotation of said closure cap about said closure body, and;
    (b) a ramp at another end thereof to resist axial rotation of said closure cap about said closure body in an opposite direction.

3. The assembly of claim 2, characterized in that said lower portion of said cap bails have a diameter less than the plastic body clamp flange.

4. The assembly of claim 2, characterized in that said annular body skirt comprises a nominally cylindrical axially disposed skirt outer surface to abut one or more body skirts of one or more other assemblies so as to prevent entanglement of said assemblies.

5. The assembly of claim 4, characterized in that said body clamp flange is adapted to be inserted into a lid injection mold and be held to a cavity insert clamp shoulder.

6. The assembly of claim 5, characterized in that said closure cap has a diameter less than said cavity insert clamp shoulder such that said closure cap can be engaged to said closure body during insert molding.

7. The assembly of claim 1 characterized in that said annular body skirt is connected to a lid in lid injection mold.

8. The assembly of claim 4, characterized in that said body clamp flange is adapted to be inserted into a lid injection mold and be held to a core insert clamp shoulder.

9. The assembly of claim 8, characterized in that said core insert clamp shoulder is disposed between said closure body web and said body skirt and said core insert clamp shoulder does not contact said conical body web.

10. The assembly of claim 9, characterized in that said closure body further comprises one or more flow restrictor tabs disposed axially around said conical body web, and wherein said mold has an opening adapted to receive said closure body without making contact with said closure body.

11. The assembly of claim 1, characterized in that said assembly is engaged to a plastic container lid by securely holding said assembly in said mold and insert molding molten plastic into said annular skirt top recesses, around said skirt outer surface of said body skirt and into said annular skirt bottom recess, creating in cross section a "C clamp" shaped mechanical lock between said container lid and said body skirt.

12. The assembly of claim 11 characterized in that said engagement is by means of a mechanical lock between said annular skirt top recess, said skirt outer surface of said body skirt, said annular skirt bottom recess and said plastic container lid.

13. The assembly of claim 11 characterized in that said engagement is by means of plastic fusion between said plastic closure body and said plastic container lid.

14. The assembly of claim 5, 8, or 7 characterized in that said body clamp flange is held to said cavity insert clamp shoulder by means selected from the group consisting of: vacuum, mechanical interlock, any combination thereof.

15. A two part closure assembly for dispensing fluids from a container having a lid, comprising:

(a) a plastic closure body having a flexible substantially conical body web disposed generally along a central axis, said body web extendible between a nested position and an extended position;
(b) said conical body web extending inward to a cylindrical body neck and extending radially outward to a radial body clamp flange;
(c) a body skirt extending further radially outward from said body clamp flange and presenting an axially disposed skirt inner surface spaced from an axially disposed skirt outer surface;
(d) a first annular skirt top recess disposed between said body clamp flange and said body skirt;
(e) a second annular skirt bottom recess disposed in said skirt inner surface, said second annular skirt bottom recess axially spaced from said first annular skirt top recess;
(f) a plastic closure cap threadably engageable to said body neck;
(g) said first annular top recess, said skirt outer surface, and said second annular skirt bottom recess engaging said lid of said container.

16. A two part closure assembly as claimed in claim 15 wherein said first annular skirt top recess and said second annular skirt bottom recess are disposed at the same radial distance from said central axis.

* * * * *